(No Model.)
J. A. DAVISON.
PHOTOGRAPHIC CAMERA.
No. 494,097. Patented Mar. 21, 1893.
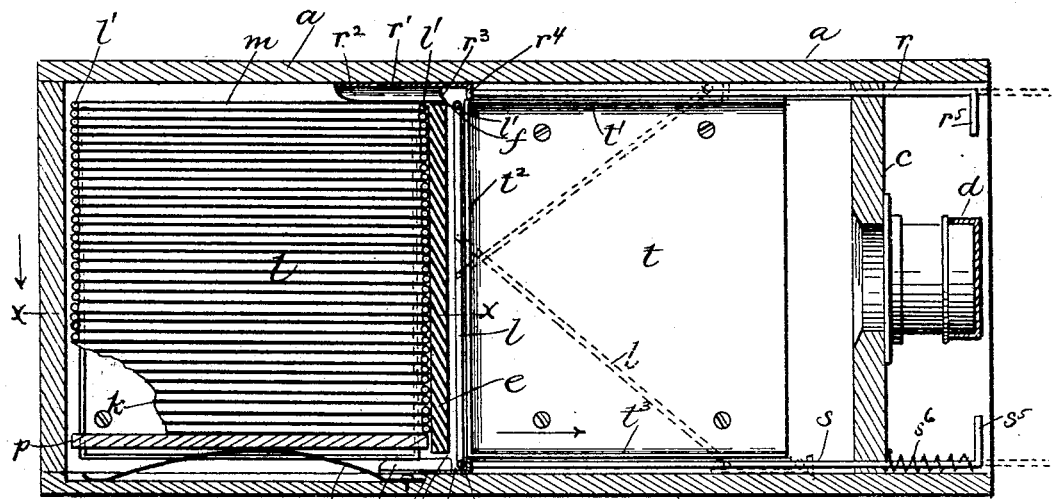
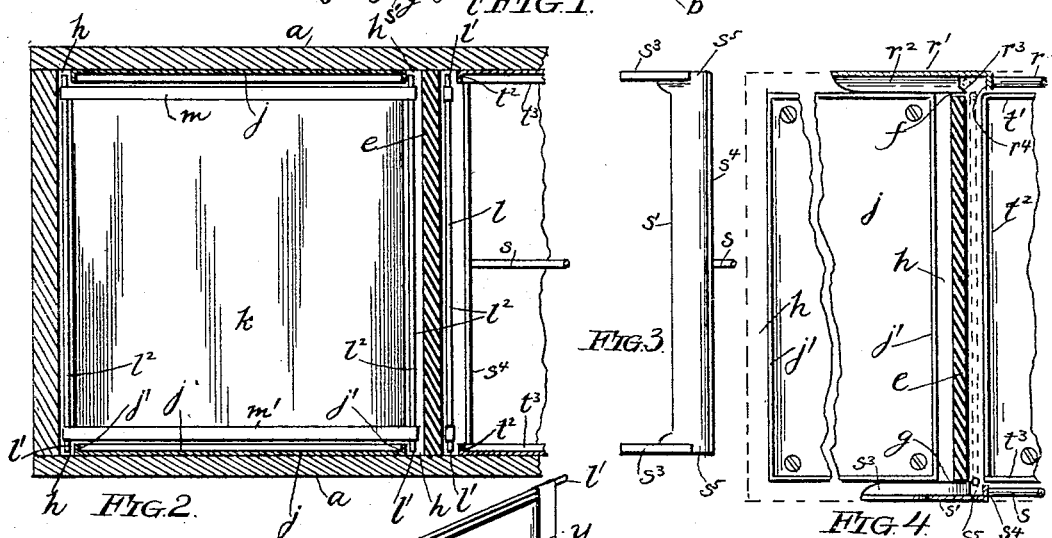
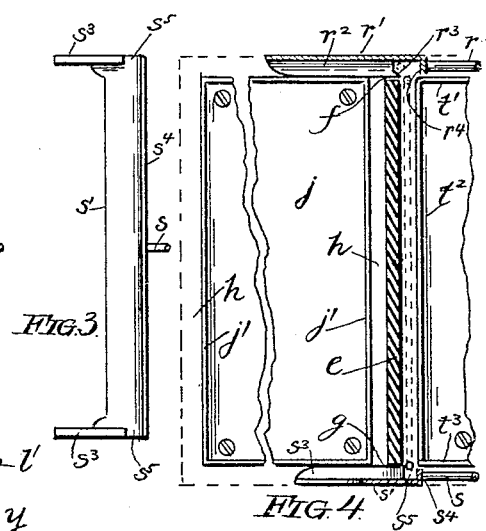
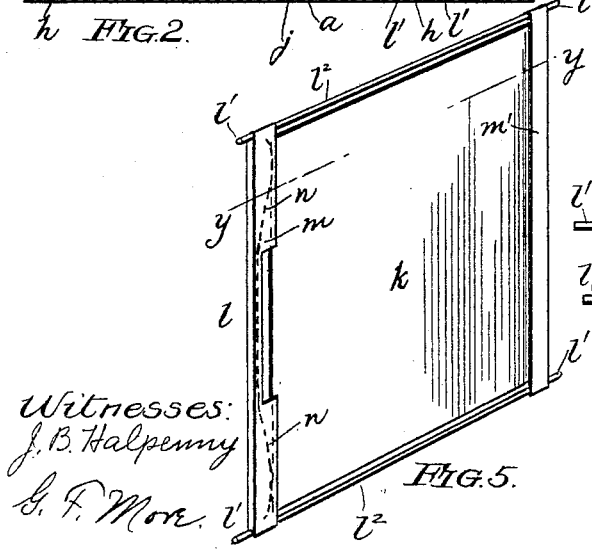
Witnesses:
J. B. Halpenny
G. F. Moore
Inventor:
Joseph A. Davison

UNITED STATES PATENT OFFICE.

JOSEPH A. DAVISON, OF POLO, ASSIGNOR, BY DIRECT AND MESNE ASSIGNMENTS, TO THE ALADDIN CAMERA COMPANY, OF CHICAGO, ILLINOIS.

PHOTOGRAPHIC CAMERA.

SPECIFICATION forming part of Letters Patent No. 494,097, dated March 21, 1893.

Application filed February 8, 1892. Serial No. 420,718. (No model.)

*To all whom it may concern:*

Be it known that I, JOSEPH A. DAVISON, of Polo, in the county of Ogle and State of Illinois, have invented a new, useful, and Improved Photographic Camera, of which the following is a full, clear, and exact description, reference being had to the accompanying drawings, forming a part of this specification, in which—

Figure 1. is a vertical sectional elevation of a camera embodying the features of my invention. Fig. 2. is a sectional view in plan, taken upon the line $x$—$x$, Fig. 1. Fig. 3. is a plan view in detail of one of the plate moving devices. Fig. 4. is a vertical sectional view in detail of a portion of the camera including the magazine,—and showing the grooves or guides which serve to manipulate the plates. Fig. 5. is a perspective view of one of my improved plate-holders. Fig. 6. is a sectional view thereof, taken upon the line $y$—$y$, Fig. 5, and Fig. 7. is an edge view of a modified form of holder adapted for the reception of films.

Corresponding letters of reference in the different figures indicate like parts.

The object of my invention is to so construct a hand or magazine camera, that it may be simple, light and compact and yet adapted to hold a maximum number of plates or films which may be easily exposed in successive order without removal from the camera. A further object is to prevent any of said plates from being removed a second time from the magazine by means of the plate manipulator after they have once been exposed;—thereby avoiding the chances, for a second exposure. Moreover, I desire to so construct a plate-holder to be used in connection with said camera, that it may, by means of suitable manipulators, be removed from the magazine, properly exposed and returned to said magazine without withdrawing it from the camera or exposing it to rays of light other than those passing through the lens.

To these ends, my invention consists in the combination of elements hereinafter more particularly described and claimed.

Referring to the drawings, $a$ represents the frame or case of my improved camera, which consists of an oblong, rectangular box, provided with a bottom $b$, Fig. 1, which may be either hinged thereto, in any approved form or arranged to slide in suitable grooves so that it may be wholly or partially removable. At or near one end of said case is a partition $c$ upon which the lens $d$, is mounted in the usual manner, while a secondary partition $e$, serves to separate the magazine from the exposing chamber immediately back of the lens, as clearly shown in said last named figure. Said partition $e$, is attached rigidly to the respective sides of the case, but spaces $f$ and $g$, Fig. 1, are left at the top and bottom respectively, said spaces being of sufficient width to permit a plate and its holder to be withdrawn or inserted therein, as hereinafter specified.

The magazine chamber is preferably provided with vertical guides $h$ Figs. 2 and 4, formed by attaching metal plates $jj$ upon opposite sides of the case, said plates being provided with flanges $j'$. The sensitive plates $k$, are placed in holders $l$, which may consist of any suitable skeleton frame adapted to surround the edges of the plate so as to provide means for the formation of lugs $l'$ thereon, or it may have a back of sheet-metal, card-board or any suitable material; but for glass-plates I prefer the skeleton form which may consist of two sheet-metal plates $m\ m'$, bent in U form, to the respective ends of which are attached wires $l^2$ having the projecting ends $l'$, as described. Between the flanges of the part $m$, I place a bent spring $n$, shown in Fig. 6, and indicated in dotted lines in Fig. 5, which is adapted to engage with one end of the plate $k$, and press it against a beveled flange $m^2$, Fig. 6, formed upon the part $m'$, or, if desired, between the sides or flanges of said part $m'$. The plate is thus held temporarily in place in the holder, by means of which it may be manipulated in the camera.

Upon the part $b$, which forms the bottom of the camera, I place springs $o$, Fig. 1, one end of which is attached to the bottom while the other is free to move, thereby enabling said springs to be depressed, or to retain the normal position shown in said figure.

In order to fill the magazine, the camera is inverted, the bottom $b$ opened and the plates $k$ with their holders, placed in position as indicated in Figs. 1 and 2, until the magazine is filled, when a piece of wood or paste-board, p, Fig. 1, which I term a "blank," is placed upon them. The bottom is then closed, when the springs o, exert a pressure upon the plates, so that when the position of the camera is reversed to that shown in Fig. 1, the uppermost plate is pressed against the top with a yielding pressure.

Located in the top of the camera, and extending outwardly, through the partition c at the front, is a rod r, Figs. 1 and 4, which is rigidly attached to a metal cross-head $r'$, adjusted to rest loosely in grooves or guides formed in or upon opposite sides of the case so as to enable said cross-head to be reciprocated by means of the rod r, and pushed into the magazine or drawn therefrom into the exposing chamber a distance corresponding to the width of a plate-holder. Flanges $r^2$, better shown in Fig. 4, are formed upon the cross-head $r'$, and upon the rear end or heel of each is a slight hook $r^3$, adapted to engage with the lugs $l'$, as hereinafter stated, while the forward end is rounded or wedge-shaped so that when the rod r is pushed back, said flanges may pass over the lugs $l'$, to enable said hooks to engage therewith. Just back of the hooks is a vertical flange $r^4$, which forms a shoulder against which the plate-holder may loosely rest when in engagement with said hooks for the purpose hereinafter stated.

A secondary rod s, provided with a cross-head $s'$, substantially like the cross-head $r'$, is arranged upon the bottom of the camera,— the rod s projecting through the partition c. Both the rods r and s, are bent at the outer ends substantially as shown at $r^5$ $s^2$, to enable said rods to be grasped and manipulated by the operator. The cross-head $s'$, is provided with flanges $s^3$ Figs. 1 and 3, and an upwardly projecting flange $s^4$, at the rear thereof;—a space being left between the ends of the flanges $s^3$, and the flange $s^4$, as shown at $s^5$ $s^5$, so that the end of the plate holder l, may rest against the flange $s^4$, while the lugs $l'$ $l'$, are in the notches or spaces $s^5$, respectively. Upon opposite sides of the interior of the camera I prefer to attach, by means of screws or otherwise, sheet-metal plates t, Figs. 1, 2 and 4, having flanges $t'$ $t^2$. $t^3$, thereon, to serve as guides for the lugs $l'$, of the plate-holders, as hereinafter stated.

Having thus described the various parts of my improved camera, I will now explain its operation. Assuming the magazine to be filled as described, and as indicated in Fig. 1, in order to expose a plate, the rod r, is pushed back by the operator until the hooks $r^3$, are past the lugs $l'$ $l'$, of the plate-holder, when the action of the springs o, causes the plate-holder to be lifted so that the lugs are brought into engagement with said hooks. The rod r, is then drawn out from the front until the lugs upon the rear end of the plate-holder are brought into position between the partition e, and the guide or flange $t^2$. Said lugs then fall into said guide-spaces; and, as the rod $r^5$, is pushed back, the rear end drops down;—the plate making an oblique movement as indicated in the upper oblique dotted lines in Fig. 1. When the rod r is pushed back to its normal position, the plate-holder l rests in a vertical plane against the partition e, with the bottom lugs in the spaces $s^5$, of the lower plate-mover. After exposing the plate, the rod s, is drawn forward, when the shoulders upon the flanges $s^3$, engage with the lugs $l'$ and carry them forward beneath the guide $t^3$;—the plate and holder gradually assuming an oblique position as indicated in dotted lines, until they lie upon and are parallel with the bottom of the camera. The rod s, is then reversed; thereby pushing the plate beneath the partition e; and the lugs $l'$ $l'$, passing between the springs o o and the blank p, depresses the former and permits the plate and holder to be slid into position beneath said blank. In order to effect this result, it is necessary to push the rod back far enough to cause the flange $s^4$ of the cross-head to pass beneath the partition e. But it is essential that the spaces $s^5$ $s^5$ should register normally with the space between the partition e, and flange $t^2$, so that the lugs of the next plate to be exposed may be engaged by said cross-head when the plate is lowered. To accomplish this end, I provide a spring $s^6$, Fig. 1, which is placed in front of the partition c and serves to draw said cross-head forward to its normal position as shown in Figs. 1 and 4. If double holders are employed, as shown in Fig. 7, which I recommend for the use of films, then the blank p, may be dispensed with; and, as the faces of the plates are reversed during the operation of exposing and changing, it is only necessary to go through the same manipulation of the holders until all the films are exposed. The employment of the blank p prevents a second exposure of the plates as no plate can be withdrawn when said blank has reached the top.

The advantages of my improved device are that a maximum number of plates or films may be carried in the most compact form and readily exposed. If only a portion of those in the magazine are exposed and it is desired to develop them, it is only necessary to open the lid and remove all of the plates between the blank k and the lid,—thereby avoiding any uncertainties as to what plates are exposed and what not.

Having thus described my invention, I claim—

1. The combination with a camera having a plate holding space or receptacle in the rear, parallel guides in the sides of the camera at the bottom and top respectively, for the reception of laterally projecting plate-holder lugs, vertical guides upon opposite sides of the camera connecting said parallel guides in the bottom and top, plate shifters arranged to move in parallel planes in said bottom and top guides, means for actuating the same from the outside of the camera, and means upon said plate shifters for engaging laterally projecting lugs upon the corners of movable plate-holders whereby a plate may be withdrawn from the top of the pile with one of said shifters and permitted by its own gravity to assume a vertical position in front of the objective, and thence removed by the secondary shifter and restored to the bottom of said pile, substantially as shown and described.

2. The combination with a camera having a magazine chamber in the rear, a partition separating said magazine chamber from the remainder of the camera, said partition being provided with an opening at the bottom and top respectively for the egress and ingress of plates, horizontal guides upon the sides of said camera at the bottom and top respectively, and in line with said partition openings, vertical guides in the sides of the camera immediately in front of said partition, connecting with said horizontal guides, and plate shifters arranged to slide in said horizontal guides and to engage with laterally projecting plate-holder lugs adapted to move in said horizontal and vertical guides, substantially as shown and described.

3. The combination with a camera having a magazine chamber in the rear, of sliding cross-heads $r'$ $s'$ arranged to move in suitable parallel guides, which are connected by means of vertical guides, said cross-heads or shifters being provided with means for engaging laterally projecting lugs upon movable plate-holders, and arranged to face each other whereby said lugs may, by the gravity of the plate, be disengaged from one of said shifters and engaged by the other, substantially as set forth.

In testimony whereof I have signed this specification, in the presence of two subscribing witnesses, this 1st day of February, 1892.

J. A. DAVISON.

Witnesses:
JAMES W. ALLABEN,
GEORGE F. MORE.